United States Patent
Lukacs et al.

(10) Patent No.: US 10,049,211 B1
(45) Date of Patent: *Aug. 14, 2018

(54) HARDWARE-ACCELERATED PREVENTION OF CODE REUSE ATTACKS

(71) Applicant: Bitdefender IPR Management Ltd., Nicosia (CY)

(72) Inventors: Sandor Lukacs, Floresti (RO); Andrei V. Lutas, Satu Mare (RO); Dan H. Lutas, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 14 days.

This patent is subject to a terminal disclaimer.

(21) Appl. No.: 14/799,927

(22) Filed: Jul. 15, 2015

Related U.S. Application Data

(60) Provisional application No. 62/025,059, filed on Jul. 16, 2014.

(51) Int. Cl.
*G06F 21/56* (2013.01)
*G06F 21/52* (2013.01)
*G06F 21/55* (2013.01)

(52) U.S. Cl.
CPC .......... *G06F 21/566* (2013.01); *G06F 21/52* (2013.01); *G06F 21/554* (2013.01); *G06F 2221/034* (2013.01)

(58) Field of Classification Search
CPC ...... G06F 9/542; G06F 9/30058; G06F 9/324; G06F 9/327; G06F 9/45533;
(Continued)

(56) References Cited

U.S. PATENT DOCUMENTS 6,304,959 B1   10/2001   Konigsburg et al.
7,178,132 B2   2/2007    Pierce
(Continued)

OTHER PUBLICATIONS

Bania, "Security Mitigations for Return-Oriented Programming Attacks," arXiv: 1008A099v1, Kryptos Logic Research Whitepaper, 2010, the year of publication is sufficiently earlier than the effective U.S. filing date and any foreign priority date so that the particular month of publication is not an issue.
(Continued)

*Primary Examiner* — Hadi S Armouche
*Assistant Examiner* — Paul E Callahan
(74) *Attorney, Agent, or Firm* — Law Office of Andrei D Popovici, PC

(57) ABSTRACT

Described systems and methods allow protecting a host computer system from malicious software, such as return-oriented programming (ROP) and jump-oriented programming (JOP) exploits. In some embodiments, a processor of the host system is endowed with two counters storing a count of branch instructions and a count of inter-branch instructions, respectively, occurring within a sequence of instructions. Exemplary counted branch instructions include indirect JMP, indirect CALL, and RET on x86 platforms, while inter-branch instructions consist of instructions executed between two consecutive counted branch instructions. The processor may be further configured to generate a processor event, such as an exception, when a value stored in a counter exceeds a predetermined threshold, and/or when a branch instruction redirects execution to a critical OS function. Such events may be used as triggers for launching a malware analysis to determine whether the host system is subject to a code reuse attack.

20 Claims, 9 Drawing Sheets

(58) Field of Classification Search
CPC ..... G06F 2221/033; G06F 2009/45587; G06F 21/577
See application file for complete search history.

(56) References Cited

U.S. PATENT DOCUMENTS

| | | | |
|---|---|---|---|
| 7,287,283 B1 | 10/2007 | Szor | |
| 7,552,477 B1 | 6/2009 | Satish et al. | |
| 7,730,473 B2* | 6/2010 | Mountain | G06F 9/547 |
| | | | 717/163 |
| 7,975,132 B2 | 7/2011 | Bean et al. | |
| 8,141,163 B2 | 3/2012 | Pike | |
| 8,402,541 B2 | 3/2013 | Craioveanu et al. | |
| 8,479,053 B2 | 7/2013 | Rajwar et al. | |
| 9,305,167 B2* | 4/2016 | Lutas | G06F 21/56 |
| 9,405,708 B1* | 8/2016 | Pohlack | G06F 12/1408 |
| 2005/0071605 A1 | 3/2005 | Hsieh | |
| 2005/0289331 A1* | 12/2005 | Watt | G06F 9/30058 |
| | | | 712/245 |
| 2007/0180524 A1* | 8/2007 | Choi | G06F 12/1441 |
| | | | 726/23 |
| 2008/0114975 A1 | 5/2008 | Yen | |
| 2008/0184016 A1 | 7/2008 | Erlingsson et al. | |
| 2013/0024676 A1 | 1/2013 | Glew et al. | |
| 2014/0075556 A1 | 3/2014 | Wicherski | |
| 2014/0082329 A1 | 3/2014 | Ghose | |
| 2015/0095628 A1* | 4/2015 | Yamada | G06F 21/54 |
| | | | 712/234 |

OTHER PUBLICATIONS

Polychronakis et al., "ROP Payload Detection Using Speculative Code Execution," 6th International Conference on Malicious and Unwanted Software, IEEE, Fajardo, Puerto Rico, Oct. 2011.
Pappas, "kBouncer: Efficient and Transparent ROP Mitigation," http://www/cs/columbia.edu/~vpappas/papers/kbouncer.pdf, Columbia University, New York City, New York, Apr. 1, 2012.
Tang, "Exploring Control Flow Guard in Windows 10," Trend Micro, http://sjc1-te-ftp.trendmicro.com/assets/wp/exploring-control-flow-guard-in-windows10.pdf, Jan. 30, 2015.
Hogg, "Visual Studio 2015 Preview: Work-in-Progress Security Feature," http://blogs.msdn.com/b/vcblog/archive/2014/12/08/visual-studio-2015-preview-work-in-progress-security-feature.aspx, Dec. 8, 2014.

* cited by examiner

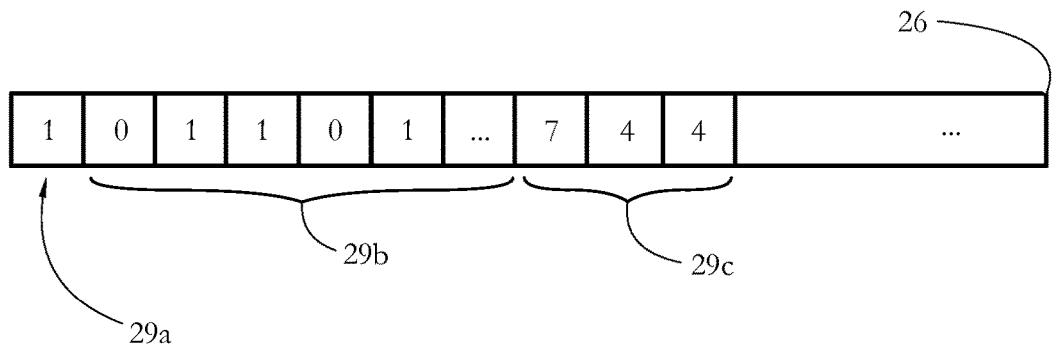
FIG. 3-A
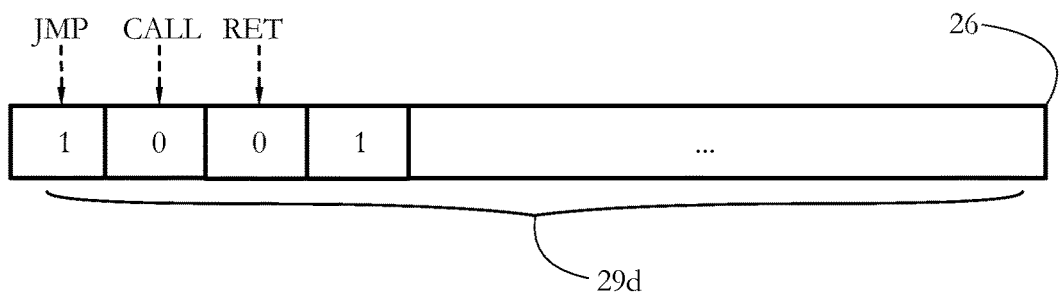
FIG. 3-B
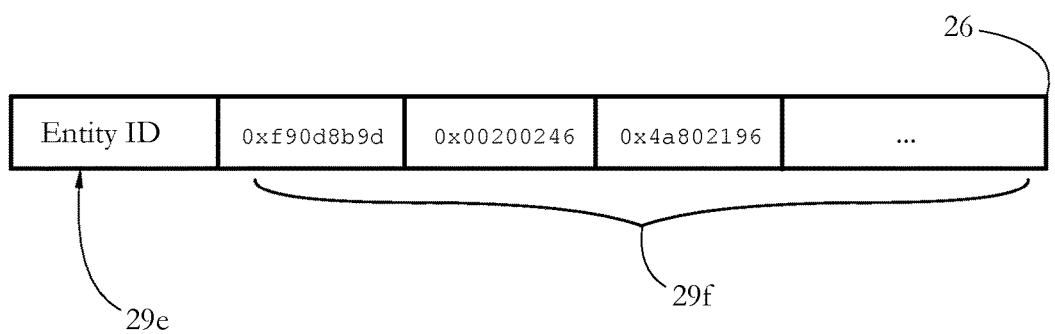
FIG. 3-C

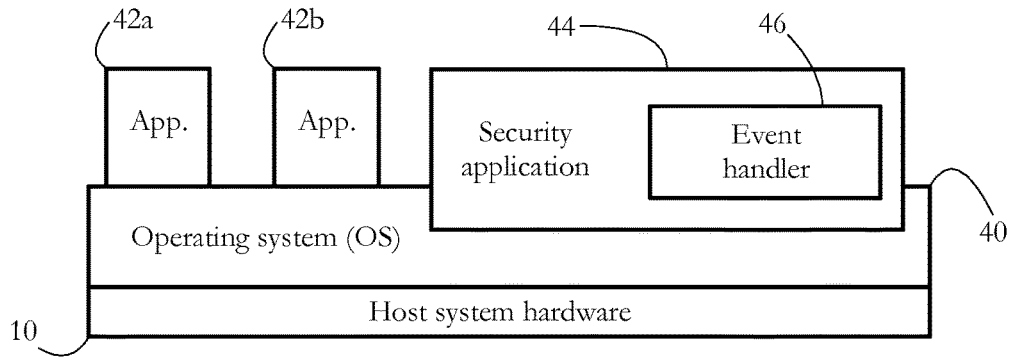
FIG. 4-A
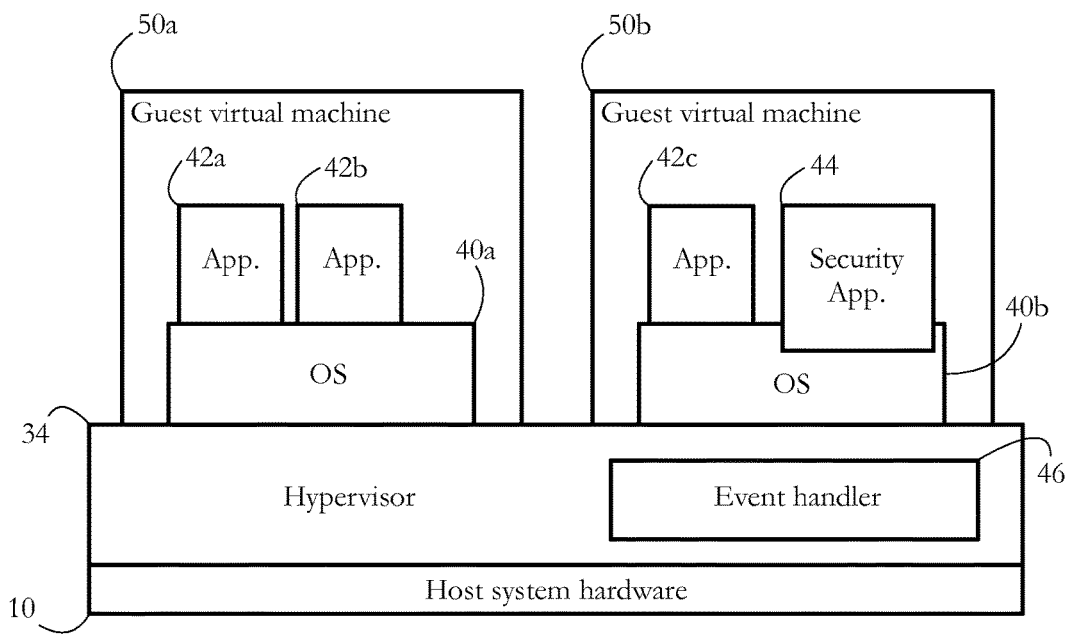
FIG. 4-B

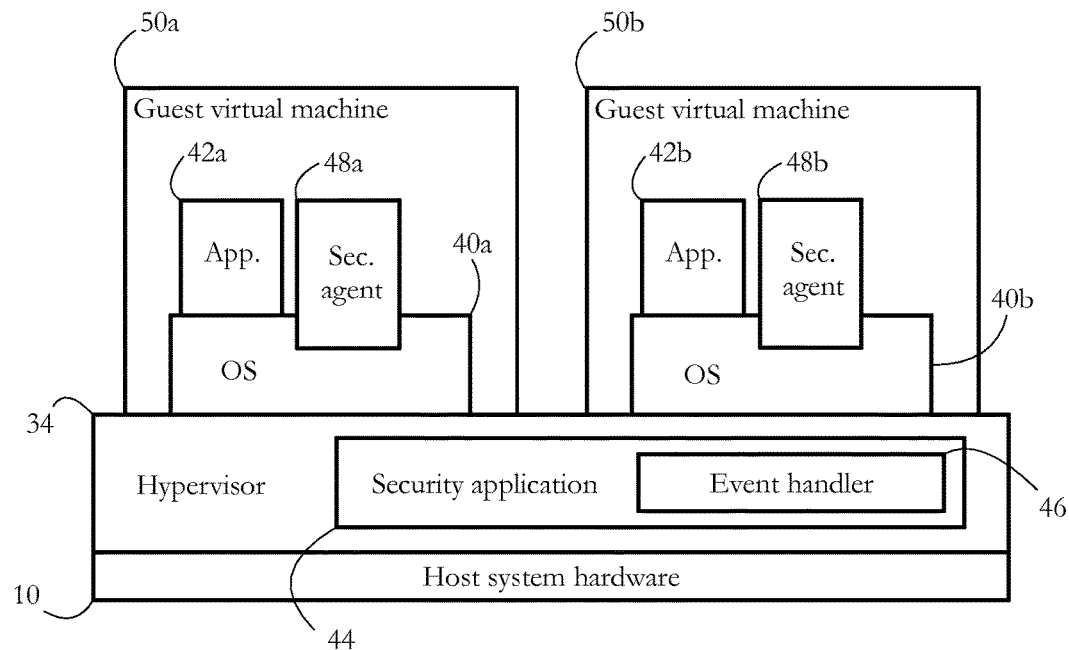
FIG. 4-C
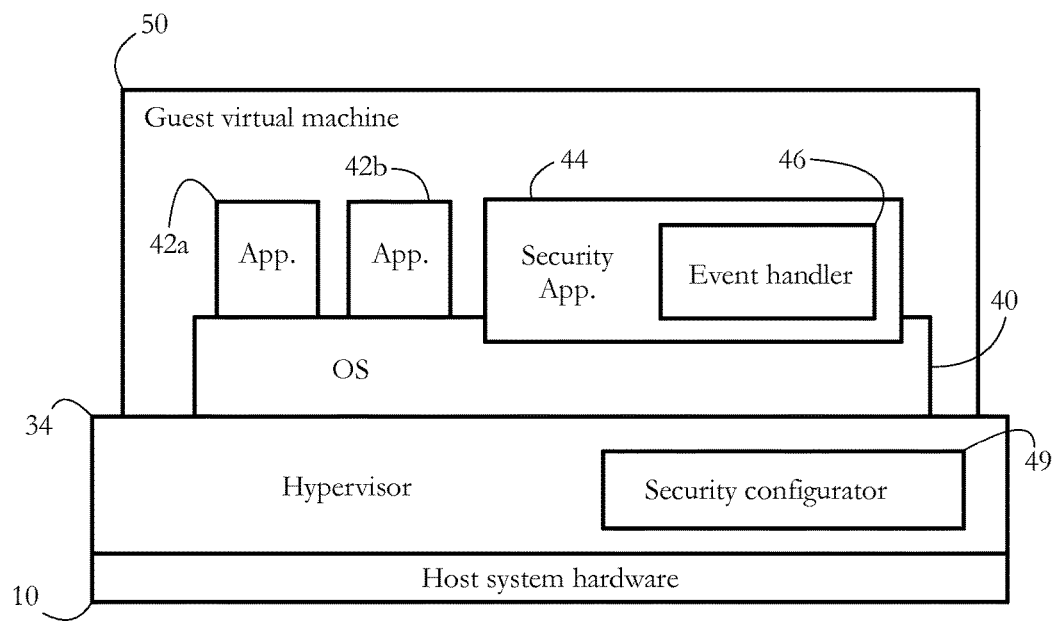
FIG. 4-D

HARDWARE-ACCELERATED PREVENTION OF CODE REUSE ATTACKS

RELATED APPLICATIONS

This application claims the benefit of the filing date of U.S. provisional patent application No. 62/025,059, filed on Jul. 16, 2014, entitled "Hardware-Accelerated Prevention of Code Reuse Attacks", the entire contents of which are incorporated by reference herein.

BACKGROUND

The invention relates to computer security and in particular to systems and methods for protecting computer systems against malicious software.

Malicious software, also known as malware, affects a great number of computer systems worldwide. In its many forms such as computer viruses, worms, rootkits, unsolicited adware, ransomware, and spyware, malware presents a serious risk to millions of computer users, making them vulnerable to loss of data and sensitive information, identity theft, and loss of productivity, among others. Malware may further display material that is considered by some users to be obscene, excessively violent, harassing, or otherwise objectionable.

A particular kind of malware consists of a code reuse attack. Some examples of such malware and attack include return-oriented programming (ROP) and jump-oriented programming (JOP) exploits. A typical ROP exploit, also known in the art as a return-into-library attack, includes an illegitimate manipulation of a call stack used by a thread of a process, the illegitimate manipulation intended to alter the original functionality of the respective thread/process. For instance, an exemplary ROP exploit may manipulate the call stack so as to force the host system to execute a sequence of code snippets, known as gadgets, each such gadget representing a piece of legitimate code of the target process. Careful stack manipulation may result in the respective code snippets being executed in a sequence, which differs from the original, intended sequence of instructions of the original process or thread.

A typical JOP attack comprises exploiting a buffer overflow vulnerability to create a dispatch table. Such a dispatch table may be used to re-organize the execution of a legitimate thread or process, by making execution jump from one gadget to another in a pre-determined sequence that carries out a malicious activity instead of the original, intended activity of the targeted process/thread.

By re-using pieces of code from legitimate processes to carry out malicious activities instead of explicitly writing malicious code, ROP and JOP exploits may evade detection by conventional anti-malware techniques. Several anti-malware methods have been proposed to address code-reuse attacks, but such methods typically place a heavy computational burden on the respective host system, negatively impacting user experience. Therefore, there is a strong interest in developing systems and methods capable of effectively targeting code reuse malware, with minimal computational costs.

SUMMARY

According to one aspect, a host system includes at least one hardware processor comprising a branch counter register, a configuration register, and a counter control unit connected to the branch counter register and to the configuration register. The branch counter register stores a count of branch instructions occurring within a sequence of instructions belonging to a process currently being executed by the at least one hardware processor. The configuration register stores a memory address. The counter control unit comprises hardware logic configured to compare the count of branch instructions to a predetermined first threshold, and in response, when the count of branch instructions exceeds the first threshold, to determine whether a selected instruction of the sequence causes the at least one hardware processor to execute code stored at a memory location indicated by the memory address. In response, when the selected instruction causes the at least one hardware processor to execute code stored at the memory location, the counter control unit is further configured to trigger a switch event causing the at least one hardware processor to switch from executing the process to executing an event handler routine.

According to another aspect, a method comprises employing a branch counter register of a hardware processor of a host system to store a count of branch instructions occurring within a sequence of instructions belonging to a process currently being executed by the processor. The method further comprises employing a configuration register of the hardware processor to store a memory address. The method further comprises, in response to storing the count of branch instructions, employing a counter control unit of the hardware processor to compare the count of branch instructions to a predetermined first threshold. The method further comprises, in response, when the count of branch instructions exceeds the first threshold, employing the counter control unit to determine whether a selected instruction of the sequence causes the hardware processor to execute code stored at a memory location indicated by the memory address. In response, when the selected instruction causes the hardware processor to execute code stored at the memory location, the method further comprises triggering a switch event causing the hardware processor to switch from executing the process to executing an event handler routine.

According to another aspect, a non-transitory computer-readable medium stores instructions which, when executed by at least one hardware processor of a host system, cause the host system to form an event handler and a security application. The event handler is configured to detect a switch event generated within the at least one hardware processor while the at least one hardware processor is executing a process, the switch event causing the at least one hardware processor to switch from executing the process to executing the event handler. The security application is configured to determine whether the host system is subject to a malware attack according to the switch event. The at least one hardware processor comprises a branch counter register, a configuration register, and a counter control unit connected to the branch counter register and to the configuration register. The branch counter register is configured to store a count of branch instructions occurring within a sequence of instructions belonging to the process. The configuration register storing a memory address. The counter control unit comprises hardware logic configured to compare the count of branch instructions to a predetermined first threshold, and when the count of branch instructions exceeds the first threshold, to determine whether a selected instruction of the sequence causes the at least one hardware processor to execute code stored at a memory location indicated by the memory address. In response, when the selected instruction causes the at least one hardware processor to execute code stored at the memory location, the counter control unit is further configured to trigger the switch event.

BRIEF DESCRIPTION OF THE DRAWINGS

The foregoing aspects and advantages of the present invention will become better understood upon reading the following detailed description and upon reference to the drawings where:

FIG. 3-A shows a diagram of an exemplary counter configuration register storing a set of configuration values according to some embodiments of the present invention.

FIG. 3-B shows an exemplary counter configuration register storing a bitmap of current monitored branch instructions according to some embodiments of the present invention.

FIG. 3-C shows an exemplary counter configuration register storing a set of memory addresses according to some embodiments of the present invention.

FIG. 4-A shows an exemplary hierarchy of software components executing on the host system, the hierarchy comprising a security application operating according to some embodiments of the present invention.

FIG. 4-B shows an alternative software configuration, wherein a security application executes within a virtual machine operating on the host system, according to some embodiments of the present invention.

FIG. 4-C illustrates yet another exemplary software configuration according to some embodiments of the present invention, wherein a security application executes below an operating system.

FIG. 4-D shows an alternative exemplary software configuration according to some embodiments of the present invention, wherein both the security application and event handler execute within the protected virtual machine.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. A process is an instance of a computer program, such as an application or a part of an operating system, and is characterized by having at least an execution thread and a virtual memory space assigned to it, wherein a content of the respective virtual memory space includes executable code. The term "logic" encompasses hardware circuitry having a fixed or a reconfigurable functionality (e.g., field-programmable gate array circuits), but does not encompass software emulating such functionality on a general-purpose computer. Unless otherwise specified, a register represents a storage component integrated with or forming part of a processor, and distinct from random-access memory (RAM). Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
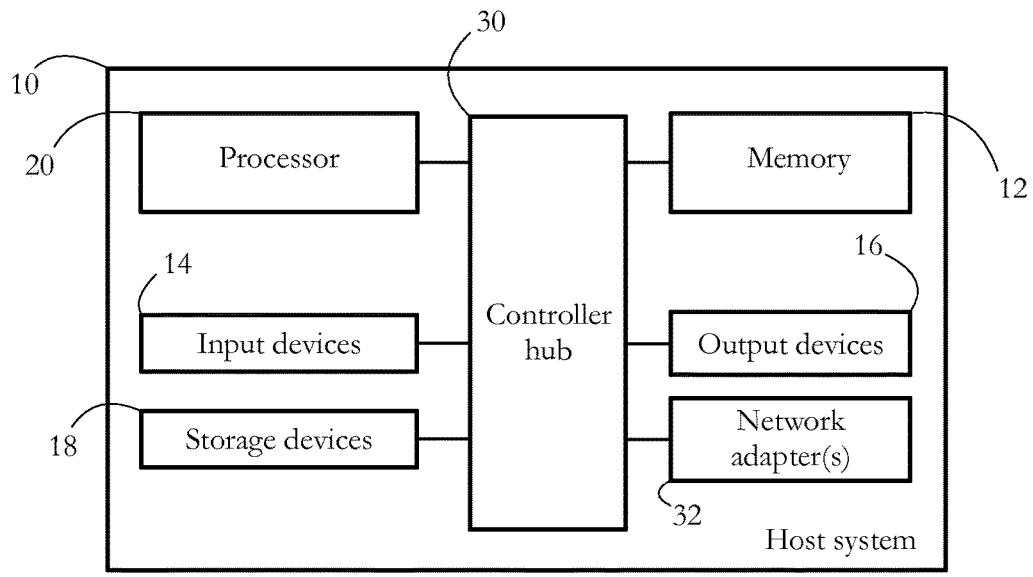
FIG. 1 shows an exemplary hardware configuration of a host system protected from malware according to some embodiments of the present invention.

FIG. 1 shows an exemplary hardware configuration of a host system 10 performing anti-malware operations according to some embodiments of the present invention. Host system 10 may represent a corporate computing device such as an enterprise server, or an end-user device such as a personal computer or a smartphone, among others. Other host systems include entertainment devices such as TVs and game consoles, or any other device having a memory and a processor, and requiring malware protection. Host system 10 comprises a set of physical devices, including a processor 20, a memory unit 12, a set of input devices 14, a set of output devices 16, a set of storage devices 18, and a set of network adapters 32, all connected by a controller hub 30.

In some embodiments, processor 20 comprises a physical device (e.g. microprocessor, multi-core integrated circuit formed on a semiconductor substrate) configured to execute computational and/or logical operations with a set of signals and/or data. In some embodiments, such logical operations are encoded in the form of a sequence of processor instructions (e.g. machine code or other type of software).

Memory unit 12 comprises volatile computer-readable media (e.g. RAM) storing processor instructions and/or data accessed or generated by processor 20. Memory unit 12 represents data storage components, e.g., memory banks, not integrated with processor 20. Input devices 14 may include computer keyboards, mice, and microphones, among others, including the respective hardware interfaces and/or adapters allowing a user to introduce data and/or instructions into host system 10. Output devices 16 may include display devices such as monitors and speakers among others, as well as hardware interfaces/adapters such as graphic cards, allowing host system 10 to communicate data to a user. In some embodiments, input devices 14 and output devices 16 may share a common piece of hardware, as in the case of touch-screen devices. Storage devices 18 include computer-readable media enabling the non-volatile storage, reading, and writing of software instructions and/or data. Exemplary storage devices 18 include magnetic and optical disks and flash memory devices, as well as removable media such as CD and/or DVD disks and drives. The set of network adapters 32 enables host system 10 to connect to a computer network and/or to other devices/computer systems. Controller hub 30 represents the plurality of system, peripheral, and/or chipset buses, and/or all other circuitry enabling the communication between processor 20 and devices 12, 14, 16, 18, and 32. For instance, controller hub 30 may include a memory controller, an input/output (I/O) controller, and an interrupt controller, among others. In another example, controller hub 30 may comprise a northbridge connecting processor 20 to memory 12 and/or a southbridge connecting processor 20 to devices 14, 16, 18, and 32.

Figure 2:
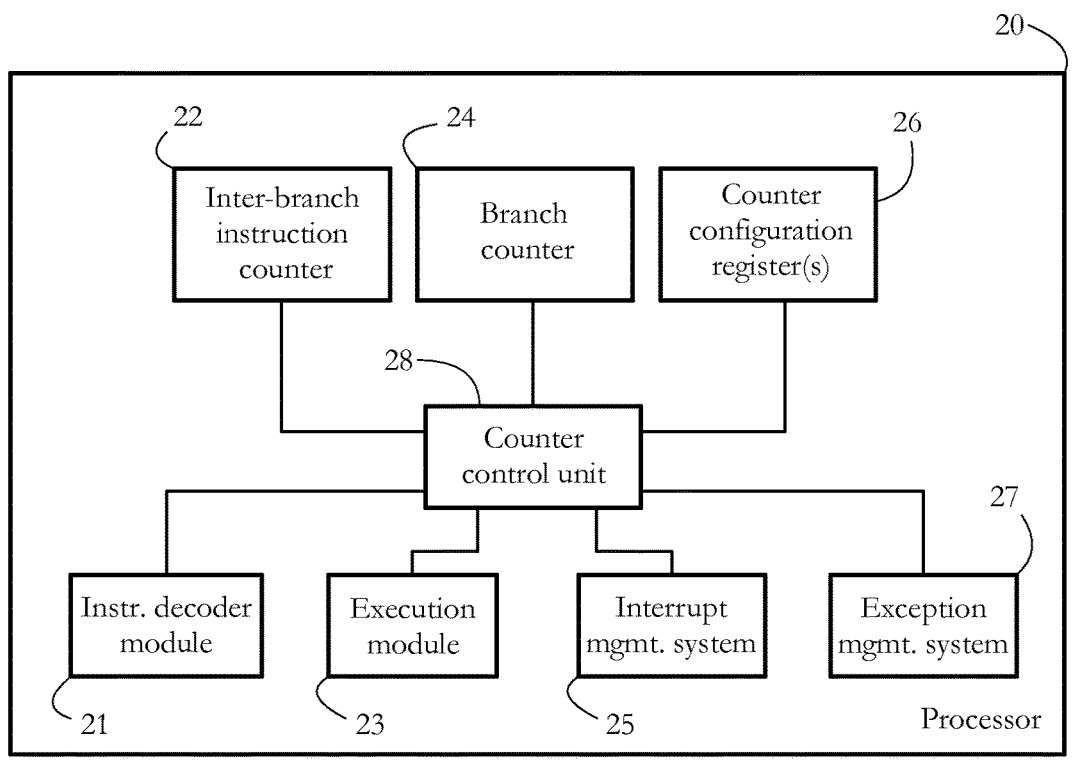
FIG. 2 shows a set of exemplary components of a hardware processor according to some embodiments of the present invention.

FIG. 2 shows exemplary components of processor 20 according to some embodiments of the present invention. Processor 20 may include logic/circuitry configured to carry out various stages of a processor pipeline. For instance, an instruction decoder module 21 may perform instruction decoding operations, while an execution module 23 may perform the execution stage of the pipeline. An interrupt management system 25 and an exception management system 27 generically denote logic configured to manage hardware interrupts and processor exceptions, respectively. Systems 25, 27 may contain multiple subsystems distributed over several processor modules. For instance, system 25 may include a local advanced programmable interrupt controller (LAPIC). Processor 20 may further include logic/circuitry (e.g., a memory management unit—MMU) configured to interact with memory 12, for instance to request data from memory 12 and/or to transmit the results of execution of various processor instructions to memory unit 12.

Beside such components, processor 20 may comprise an inter-branch instruction counter 22, a branch counter 24, a set of counter configuration registers 26, and a counter control unit 28 connected to counters 22-24 and to register(s) 26. Hardware components 22-24-26-28 may be used for the prevention of code reuse attacks, as shown in detail below. In some embodiments, counter control unit 28 is further selectively connected to other components of processor 20, such as decoder module 21, execution module 23, and interrupt and exception management systems 25-27, among others. Connecting control unit 28 to decoder module 21 may enable unit 28 to determine whether the current instruction is a branch instruction. A connection to execution module 23 may enable control unit 28 to determine a virtual address of an instruction, e.g., the current value of the instruction pointer—RIP on x86 platforms. A connection to interrupt and exception management systems 25-27 may allow control unit 28 to trigger a processor event, such as an exception, according to the current state of counters 22-24.

In some embodiments, branch counter 24 comprises a processor register configured to store a number representing a count of consecutive branch instructions occurring within a sequence of instructions executed by processor 20. Inter-branch instruction counter 22 may comprise a processor register configured to store a number representing a count of instructions occurring between two consecutive branch instructions counted by branch counter 24. Branch instructions are commonly known in the art as a particular class of processor instructions, which alter the flow of execution. Exemplary branch instructions include calls, jumps, and returns, among others. In some embodiments, counter 24 may selectively count only a subset of branch instructions, hereby termed monitored branch instructions. An exemplary monitored branch instruction is an indirect jump, such as some encodings of the JMP instruction in x86 processors. Counter registers are well known in the art of integrated circuitry, so devices 22 and 24 may be implemented using any method known in the art.

Some hardware platforms feature a hierarchy of software protection domains, also known in the art as layers, protection rings, or privilege rings. Each such layer or ring is associated to a distinct processor privilege level, so that software executing at a certain privilege level cannot directly access resources requiring higher processor privileges. Exemplary rings include ring 0 and ring 3, also termed kernel mode and user mode, respectively. On platforms supporting virtualization, a further privilege level is ring −1, also termed root mode or VMXroot on Intel® systems. In some embodiments, processor 20 includes an instance of counter registers 22-24 for each privilege ring.

In some embodiments, counters 22-24 may be configured to further store an indicator of a memory address, in addition to the respective count of branches or inter-branch instructions. For instance, branch counter 24 may record a memory address (e.g., RIP) of each counted branch instruction, while inter-branch counter 22 may record a memory address (e.g., RIP) of a first instruction of each inter-branch sequence. Such functionality may be implemented in hardware, for instance using a ring buffer with a pre-determined number of entries, e.g., 32 or 64. Saving instruction pointers for each branch may substantially facilitate anti-malware analysis. In such embodiments, security software may no longer need to calculate memory addresses of individual code gadgets, but instead directly retrieve such addresses from the respective processor registers assigned to counters 22-24.

In some embodiments, counter control unit 28 comprises logic/circuitry configured to manipulate the contents of counter registers 22 and/or 24 according to a type of instruction currently in execution. Such manipulations may include, among others, incrementing and/or resetting counters 22-24, and comparing contents of counters 22-24 with a reference value/threshold. Control unit 28 may be further configured to generate a processor event (e.g., an interrupt, an exception, or a virtual machine exit) according to a result of such comparisons. Such processor events, herein called switch events, cause processor 20 to switch from executing a monitored sequence of instructions to executing an event handler routine (e.g., an interrupt handler). Event handlers are typically registered in an interrupt descriptor table (IDT) used by processor 20.

Processor switch events generated by counter control unit 28 may be interpreted by security software executing on host system 10 as triggers for launching an anti-malware analysis of the currently executing software, as shown in more detail below. In one such example, a ROP attack is characterized by frequent branches between various snippets of code, each such snippet ending in a return instruction. Security software may detect such behavior by analyzing the call stack of the currently executing thread, but frequent analysis of the stack may place a substantial computational burden on host system 10, degrading user experience. Instead of performing frequent stack analyses, some embodiments of the present invention may rely on counters 22-24 and on counter control unit 28, to determine precisely when to run the stack analysis. For instance, counter control unit 28 may trigger an exception when the count of consecutive jumps exceeds a predetermined threshold, signaling to security software that suspicious activity is currently occurring on the call stack. More details of such functionality are given below, in relation to FIGS. 5 and 6.

In some embodiments, counter configuration register(s) 26 comprise processor registers configured to store values of various configuration parameters used for branch monitoring. A diagram of an exemplary counter configuration register is shown in FIG. 3-A. Register 26 may include a set of fields 29a-c, for instance bit fields, each such field capable of storing a value indicative of a configuration option. Some fields 29a-c may be writable by software, such as the operating system, a security application, or a hypervisor executing below the operating system, thus allowing customized software control over branch monitoring.

An exemplary field 29a may store an on/off flag indicating whether branch monitoring is currently active or not. Such an indicator may be used by processor 20 to decide whether to update counters 22-24 for the current execution context. In some embodiments, register(s) 26 may store such a flag for each of a plurality of processor privilege rings. In one such example, one bit of field 29a may indicate whether branch monitoring is on or off for processes/threads executing in kernel mode (ring 0), while another bit may indicate whether branch monitoring is on or off for processes/threads executing in user mode (ring 3).

Another exemplary field 29b of register(s) 26 may instruct processor 20 to turn branch monitoring on or off upon occurrence of certain processor events, irrespective of the current value of other fields or flags. For instance, a bit of field 29b may indicate whether to turn branch monitoring off when a hardware interrupt occurs. A practical utility of this approach may be to allow for thread-specific branch monitoring. In one such example, branch monitoring may be turned off during execution of an interrupt handler routine, and re-activated when processor 20 returns to the execution context of a targeted thread.

In some embodiments, configuration register(s) 26 may further include threshold field(s) 29c storing a first, second, and third threshold values. Such threshold values may indicate, for instance, a minimum/maximum allowed number of monitored branches, or a minimum/maximum allowed number of inter-branch instructions, and may be used by processor 20 while manipulating counters 22-24 (see below, in relation to FIG. 5).

Another part of configuration register(s) 26 may store an identifier of a monitored branch instruction, or some other indicator indicating to processor 20 which processor instructions should be considered as monitored branch instructions and therefore counted by branch counter 24, as shown in more detail below. An exemplary configuration, illustrated in FIG. 3-B, comprises a bitmap 29c including a plurality of flags, each flag corresponding to a particular processor instruction, wherein the value of each flag indicates whether the respective instruction is currently a monitored branch instruction. Some exemplary monitored branch instructions include indirect JMP, indirect CALL, and RET instructions on x86 platforms. In some embodiments, only certain variants of the instructions are monitored, according to their parameter usage and instruction encoding.

Another exemplary field of register(s) 26 may store an address of a memory section used for saving the current state of counters 22-24, for instance, when a change of execution context occurs. Such fields may be writable by software executing on host system 10, e.g., by the operating system. In some embodiments, register(s) 26 may comprise dedicated fields for storing counter values, such as current values of counters 22-24. Processor 20 may be configured to save current values of counters 22-24 to such register fields, for instance, upon a change of execution context, and to read such values from the respective fields when returning to the original execution context. In an embodiment employing virtualization (see e.g., FIGS. 4-B-C-D), processor 20 may save the state of counters to an area dedicated to storing a virtual machine state object (e.g., VMCS on Intel® platforms, VMCB on AMD® platforms) used to manage each virtual machine executing on host system 10. More details about saving and/or restoring counter states are given below, in relation to FIG. 7.

In some embodiments illustrated in FIG. 3-C, register(s) 26 further comprise a set of fields dedicated to storing a critical address table 29f with a predetermined number of entries (e.g., 16-32). Each entry of address table 29f may contain a memory address (e.g., a virtual address) of an OS function considered critical for security. Critical OS functions include, among others, functions performing memory allocation and manipulation of memory access permissions. Some examples of critical OS functions are VirtualAlloc, VirtualProtect, and ZwProtectVirtualMemory on Windows platforms. A call to such a function from a gadget may be malware-indicative. In some embodiments, each entry of the critical address table may be further associated to an entity identifier 29e, such as a process ID or a content of the CR3 register for the respective entity (e.g., process). Such indexing of entries with a entity identifier tag may enable a process-specific filtering of critical function calls, i.e., some OS functions may be considered critical in the context of some processes, and not in the context of other processes.

Entries of critical address table 29f may be writable by the operating system and/or by security software, which may select, according to various anti-malware criteria, which OS functions are considered critical for which monitored processes. The critical address table may be further connected to search logic of counter control unit 28, the search logic configured to determine whether a virtual address indicated by a monitored branch matches any of the entries of the critical address table (more details about critical function filtering are given below in relation to FIG. 5).

A skilled artisan will appreciate that, as with other monitoring parameters, critical address table 29f may also be stored in generic model-specific registers (MSR), or in RAM, as opposed to a dedicated on-chip register, as described above. In such embodiments, registers 26 may store an indicator of the respective MSRs and/or a memory address of the critical address table. Hardware implementations of the present invention should consider the trade-offs involved in storing the critical address table in a dedicated processor register as opposed to, for instance, storing the respective table in memory. While a register implementation may be limited to a pre-determined number of entries, accessing the respective register directly using dedicated logic may substantially reduce computation time taken by critical function filtering.

FIGS. 4-A-D show exemplary software configurations, wherein a security application 44 protects host system 10 against code reuse attacks according to some embodiments of the present invention. FIG. 4-A shows a host system not configured for hardware virtualization. An operating system (OS) 40 provides an interface between a set of software applications and the hardware devices of host system 10. OS 40 may comprise any widely available operating system such as Windows®, MacOS®, Linux®, iOS®, or Android™, among others. A set of exemplary applications 42a-b generically represent any application such as word processing, image processing, media player, database, calendar, personal contact management, browser, gaming, voice communication, and data communication applications, among others. In one exemplary embodiment, security application 44 includes software components capable of analyzing a call stack of a target process, to determine whether the target process is subject to a ROP exploit. In another example, application 44 includes software capable of analyzing a plurality of code snippets (e.g., gadgets), to determine whether such snippets are used in a JOP exploit. Application 44 may be configured to take advantage of hardware features of processor 20, such as counters 22-24 and counter control unit 28. For instance, application 44 may include an event handler 46 configured to detect the occurrence of a processor switch event generated by counter control unit 28, and in response to detecting the switch event, to instruct application 44 to perform a code reuse analysis of the currently executing thread.

FIG. 4-B-C-D show alternative software configurations of host system 10, that comprise a set of virtual machines exposed by a hypervisor (HV) 34. Each virtual machine 50a-b comprises an emulation of an actual physical computing device, the emulation enabling the respective VM to execute an operating system 40a-b and/or other software applications as if the respective VM possessed a set of physical hardware devices. In some embodiments, hypervisor 34, also known in the art as a virtual machine monitor (VMM), comprises software that creates the virtual environment of each guest VM 50a-b, an operation known in the art of virtualization as exposing the respective VM. Exposing a VM may include creating a plurality of virtual devices, each virtual device emulating the operation and functionality of a physical hardware device of host system 10, such as a processor and a memory controller, among others. Hypervisor 34 may further assign a set of virtual devices to each exposed VM. Examples of popular hypervisors include the VMware ESXi™ from VMware Inc. and the open-source Xen hypervisor, among others.

In some embodiments, hypervisor 34 takes control of processor 20 at the most privileged level (e.g., VMXroot on Intel® platforms supporting virtualization, also known generically as ring −1 or root mode). Most components of OSs 40a-b execute at a privilege level typically known as ring 0 or kernel-mode, less privileged than hypervisor 34. From this perspective, hypervisor 34 is said to execute below OSs 40a-b or below VMs 50a-b. Applications 42a-c typically execute with lesser processor privileges than OSs 40a-b, for instance in ring 3 or user-mode. Applications executing on a virtualized processor of a virtual machine are said to execute within the respective VM. In contrast, hypervisor 34 is said to execute outside VMs 50a-b.

In the embodiment illustrated in FIG. 4-B, security application 44 executes within guest VM 50b, protecting VM 50b from code-reuse attacks, using methods described in more detail below. There may be a security application executing within each VM exposed by hypervisor 34, each such security application protecting the respective VM. Alternatively, one such security application may protect multiple guest VMs executing on host system 10. In such embodiments, inter-VM communication necessary for anti-malware operations may be managed by hypervisor 34.

In some embodiments (e.g., FIGS. 4-B-C), event handler 46 executes below OSs 40a-b, at a processor privilege level similar to that of hypervisor 34. Handler 46 may be incorporated into hypervisor 34, or may be installed as a separate component. Event handler 146 may be configured to detect the occurrence of a processor switch event generated by counter control unit 28 of processor 20, and in response, to instruct security application 44 to perform a code reuse analysis of a thread executing within guest VM 50b. To enable interception of the switch event by handler 46, counter control unit 28 may be configured to generate a virtual machine exit event, such as a VMExit on Intel® platforms supporting virtualization. Such VM exit events suspend the execution of in-VM code and transfer control of processor 20 to hypervisor 34. Such transfer of control may allow event handler 46 to detect the occurrence of the switch event.

Upon detecting the switch event, handler 46 may need to signal to application 44 to launch the code reuse analysis routines. Transmission of messages and/or data from below the operating system to components executing within a virtual machine may be achieved using several methods known in the art of virtualization. In one example, handler 46 may inject an interrupt into guest VM 50b in response to detecting the occurrence of the switch event. Security application 44 may comprise an interrupt handler configured to intercept the respective interrupt, thus receiving notification of the switch event.

FIG. 4-C shows yet another exemplary software configuration wherein both security application 44 and event handler 46 execute below guest VMs 50a-b, at a processor privilege level similar to that of hypervisor 34. In a configuration such as FIG. 4-C, a single security application 44 may protect a plurality of VMs exposed on host system 10.

Placing security application 44 and/or event handler 46 outside the protected VM(s) may increase the security of host system 10. Malware executing within VMs 50a-b may attempt to incapacitate malware defense mechanisms, for instance, by de-activating code-reuse analysis and/or interception of switch events, or by rendering event handler 46 incapable of communicating with security application 44. Virtual machines typically operate with virtualized physical memory spaces, each such space isolated from the memory spaces of other VMs and from the memory space used by hypervisor 34. When application 44 and/or handler 46 execute outside the protected VM, memory isolation may thus offer substantial protection against malware executing within the protected VM.

However, placing security software outside the protected VMs may complicate malware detection by introducing an extra layer of complexity and therefore computational overhead. Although possible, operations such as determining memory addresses of various software objects and intercepting various events (e.g., system calls, etc.) are more complicated and computationally demanding to perform from the level of hypervisor 34 than from within the respective VM. Therefore, some embodiments achieve a compromise between security and computational burden by including a software component, such as security agents 48a-b in FIG. 4-C, within each protected VM. Agents 48a-b may include modules with minimal functionality, configured to perform operations which are rather difficult to carry out from outside the respective VM, and to communicate key data to security application 44. To transfer data (e.g. memory addresses of software objects) from within a VM, some embodiments may configure security agents 48a-b to write the respective data to a pre-determined memory location, and then trigger a VM exit event to signal that new data is available. Security application 44 may then intercept the VM exit event, and in response, read the data from the respective memory location.

FIG. 4-D shows yet another exemplary configuration, wherein both security application 44 and event handler 46 execute within a protected guest VM 50. In such configurations, the processor switch event generated by counter control unit 28 may comprise a particular type of exception known in the art as a virtualization exception (e.g., #VE on Intel® platforms. Virtualization exceptions suspend the current thread executing within VM 50 and switch processor 20 to executing an exception handler, also within guest VM 50. Thereforem registering handler 46 as the handler for virtualization exceptions may allow handler 46 to detect processor switch events. A set of techniques, such as alternating between multiple memory views by means of virtualization exceptions and a particular type of processor instruction (e.g., VMFUNC on Intel® platforms), might be used in order to enhance the security of application 44 and/or handler 46 while executing within a protected VM, as illustrated in FIG. 4-D. Moreover, some critical components of security application 44, indicated generically by security configurator 49, may execute outside the protected VM. In some embodiments, configurator 49 may set various fields of counter configuration register(s) 26 from the processor privilege level of hypervisor 34.

Figure 5:
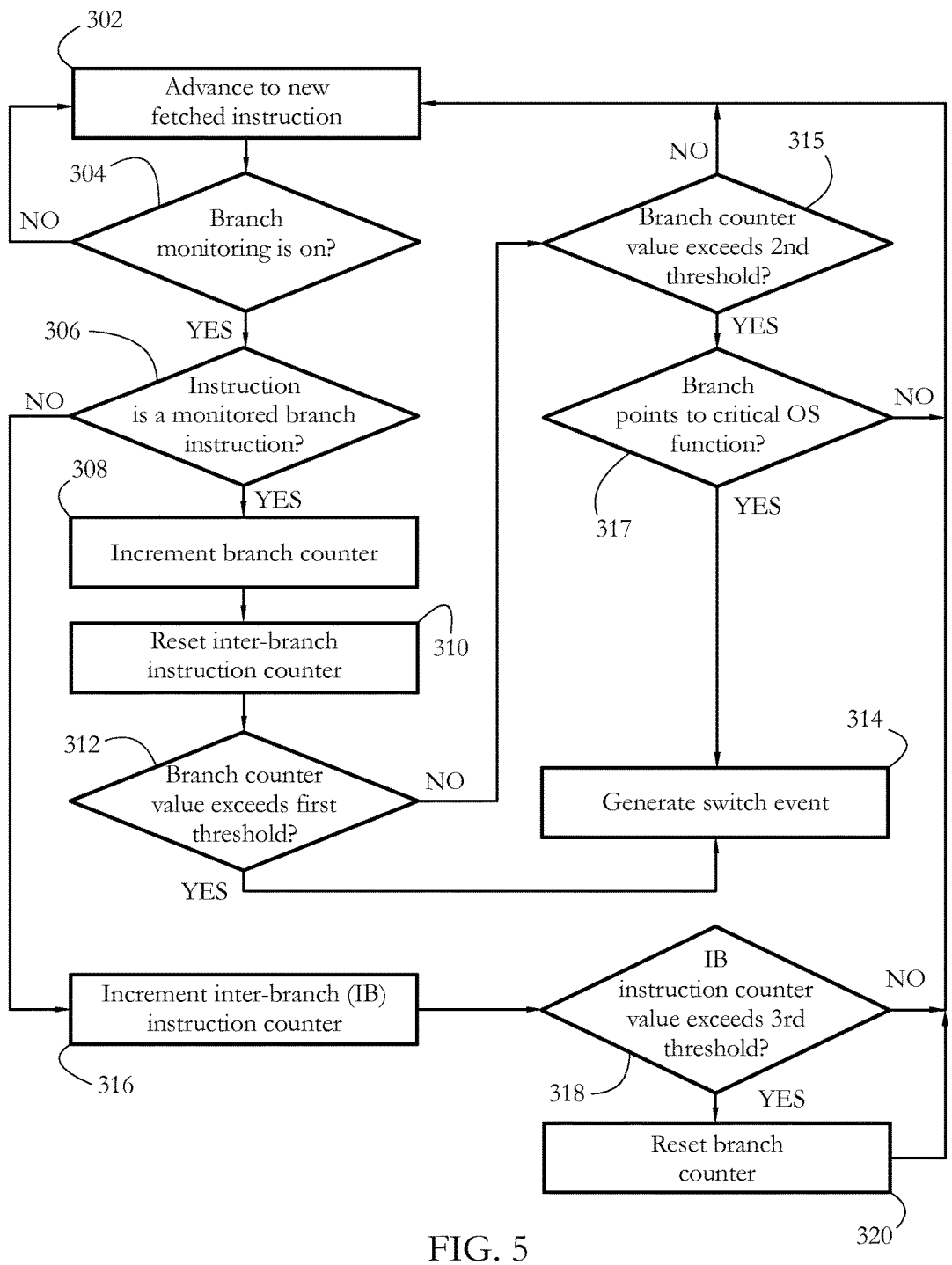
FIG. 5 shows an exemplary sequence of steps performed by the processor to carry out branch monitoring, according to some embodiments of the present invention.

FIG. 5 shows an exemplary sequence of steps performed by processor 20 to carry out branch monitoring according to some embodiments of the present invention. The illustrated sequence of steps may be included within the processor pipeline, for instance, at the execution stage, following instruction fetching and decoding. Other embodiments may implement various steps at other stages of the pipeline.

A step 304 determines whether branch monitoring is currently on, and when no, processor 20 may advance to the next fetched instruction (step 302). Branch monitoring may be turned off for a variety of reasons, such as hardware interrupts and changes of execution context. More details on how processor 20 and/or software may toggle branch monitoring on/off are given below, in relation to FIG. 7. Step 304 may comprise looking up a value of a flag bit within counter configuration register(s) 26. Processor 20 may further consider whether a processor event (such as a hardware interrupt) has recently occurred, and when such an event has occurred, to determine whether the occurrence of the event should affect branch monitoring.

When branch monitoring is on, a step 306 may determine whether the current processor instruction is a monitored branch instruction. In some embodiments, security application 44 may be interested in monitoring a particular category of instructions, which may be used in code reuse attacks. For instance, ROP exploits rely on executing a succession of code snippets, each snippet ending in a return instruction (e.g., indirect RETN or RETF on x86 platforms). In contrast, JOP exploits rely on repeated jump instructions (e.g., indirect JMP on x86 platforms) to redirect execution among code snippets. Some embodiments include return and jump instructions as monitored branch instructions, to enable processor 20 to count occurrences of such instructions in the course of execution. In some embodiments, monitored branch instructions include indirect jump instructions, such as JMP and CALL among others, wherein the destination address is read from a memory address or from a processor register. An example of such indirect jump is JMP r, wherein r denotes one of the general-purpose processor registers (e.g., EAX on x86 platforms). Some embodiments use a dedicated field of counter configuration register(s) 26 (e.g., fields 29d in FIG. 3-B) to indicate which instructions should be treated as monitored branch instructions. Step 306 may include looking up the contents of the respective field of register 26 and attempting to match the current instruction to the current contents of the respective field.

When the current instruction is a monitored branch instruction, in a sequence of steps 308-310, counter control unit 28 may increment branch counter 24 and reset inter-branch instruction counter 22 to zero. In some embodiments, in step 308, processor 20 may save a memory address of the current instruction (e.g., RIP value) to a predetermined location, such as a dedicated internal stack or circular buffer of the CPU.

Next, in a step 312, counter control unit 28 may compare the current value stored in branch counter 24 to a pre-determined first threshold (e.g., 7). The threshold value may be written by software, such as security application 44 or OS 40, into a dedicated field of counter configuration register(s) 26, and read by unit 28 from register(s) 26. When the value currently stored in branch counter 24 does not exceed the first threshold, processor 20 may proceed to a step 315 described below. When the value exceeds the first threshold, in a step 314, counter control unit 28 may generate a processor switch event, for instance by sending a signal to interrupt and/or exception management systems 25-27 of processor 20 (FIG. 2). Such a switch event may be used to signal to software, such as security application 44, that a code reuse analysis is opportune.

Exemplary switch events include interrupts, exceptions, and VM exit events, among others. The type of event generated in step 314 may vary among embodiments. Exception types may include fault, trap, and abort. Some processors are configured to generate another particular type of exception, commonly known as a virtualization exception (e.g., #VE on Intel® platforms supporting hardware virtualization). Interrupts typically occur in response to signals from hardware devices apart from processor 20, but some interrupts may be generated internally, for instance by a LAPIC of processor 20. Some types of switch events may be injected at specific stages of the processor pipeline (e.g., an invalid opcode exception is generated at the decode stage, while a page fault is generated in response to an execution attempt).

When the current value of branch counter 24 does not exceed the first threshold (step 312 above), a step 315 compares the current value of branch counter 24 to a predetermined second threshold (e.g., 4). Step 315 may thus identify gadget chains that are not sufficiently long to exceed the first threshold, but still long enough to be potentially malicious. Such situations are further analyzed in a step 317, wherein counter control unit 28 determines whether a branch instruction of the current chain points to the address of a critical OS function, such as a function performing memory allocation or other operations which may be malware-indicative. Step 317 may include comparing a destination address of the current monitored branch instruction with a table of virtual addresses of critical OS functions. The critical address table may be stored in configuration registers 26 (see above, in relation to FIG. 3). When the current branch points to a critical OS function, control unit may trigger a switch event (step 314). When no, control unit 28 may proceed to analyze the next fetched instruction.

In some embodiments, step 317 determines whether any of the monitored branch instructions of the current monitored chain (as opposed to just the current branch instruction, as described above) points to a critical OS function. Such determinations are made possible, e.g., by configuring control unit 28 to save a memory address (e.g., RIP) of each identified branch instruction to a pre-determined location. These addresses may then be looked up in step 317 and compared to entries of the critical address table. Counter control unit 28 may then trigger the switch event (step 314) when at least one branch instruction of the chain points to a critical OS function.

When the current instruction is not a monitored branch instruction (step 306 above), a step 316 may increment inter-branch instruction counter 22. Some embodiments may also save a memory address (e.g., RIP) of the current instruction to a pre-determined location. Next, in a step 318, counter control unit 28 may compare the value currently stored in inter-branch instruction counter 22 to a third threshold, which may differ in value from first and second thresholds used in step 312. The third threshold may indicate an upper limit (e.g., 4 instructions) for the length of a snippet of code separating two consecutive monitored branch instructions. When the current value stored by inter-branch instruction counter 22 does not exceed the third threshold, processor 20 may advance to the next fetched instruction (step 302).

In some embodiments, when the length of a snippet of code between two consecutive monitored branch instructions exceeds a certain length (e.g., 4 instructions), the respective snippet is considered unlikely to participate in a code reuse attack. Therefore, in some embodiments, when the value stored by inter-branch instruction counter 22 exceeds the third threshold, a step 320 resets branch counter 24 to zero.

Overall, the sequence of steps illustrated in FIG. 5 triggers a switch event (step 314) when processor 20 executes a sufficiently long succession (e.g., at least 7) of sufficiently short (e.g., at most 4 instructions) code snippets, each such code snippet bounded by monitored branch instructions. Such situations are consistent with ROP/JOP attacks, wherein multiple relatively small code snippets are chained together via branch instructions such as JMP, CALL, or RET. Additionally, the illustrated sequence may trigger a switch event even in the case of a relatively short chain of code snippets, when at least one of the respective code snippets redirects execution to a critical OS function.

Figure 6:
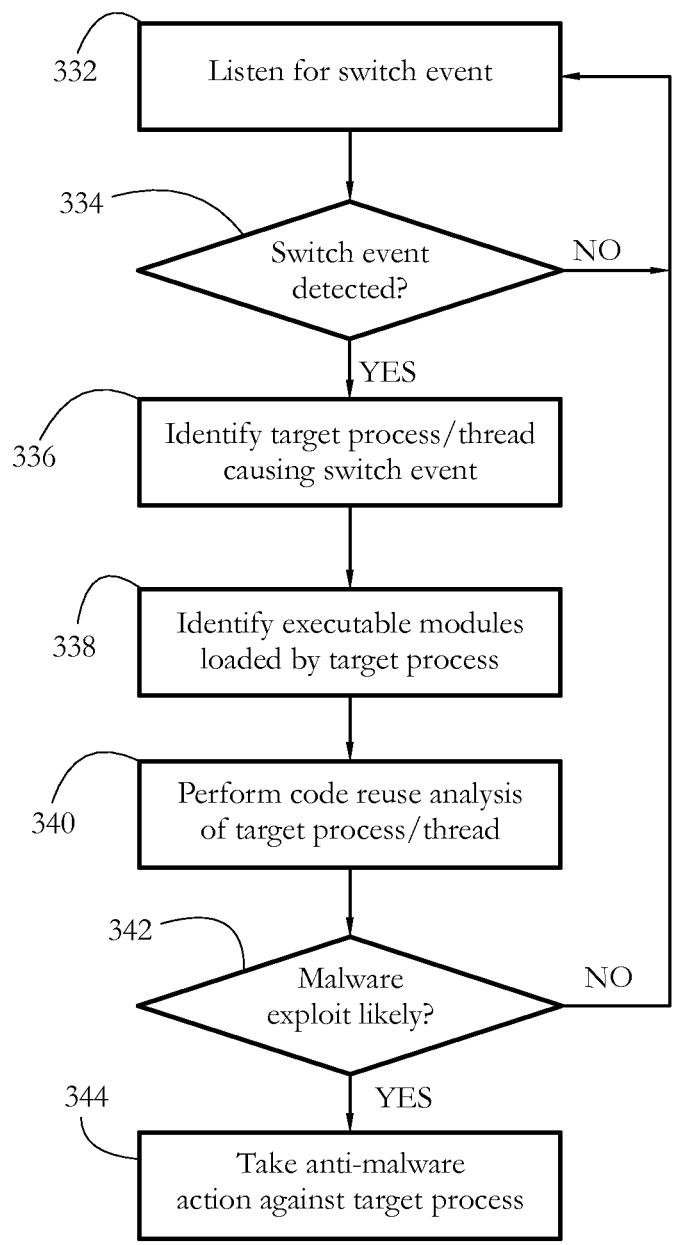
FIG. 6 shows an exemplary sequence of steps performed by the security application according to some embodiments of the present invention.

FIG. 6 shows an exemplary sequence of steps performed by security application 44 (or instances 144 or 244 in FIGS. 4-B-C) to carry out malware protection according to some embodiments of the present invention. A sequence of steps 332-334 may listen for the occurrence of a processor switch event triggered by counter control unit 28 (step 314 in FIG. 5). When a switch event is detected, for instance by event handler 46, security application 44 identifies a target process and/or target thread as the process/thread which was executing when the switch event was triggered. In a step 338, security application 44 may further identify a set of executable modules loaded by the target process. Unless otherwise specified, an executable module is a component or a building block of a process; each such module comprises executable code. Exemplary executable modules include a main executable of a process (such as an EXE file in Windows®), and a shared library (such as a dynamic-linked library—DLL), among others. In some embodiments, the main executable module of a process comprises the first processor instruction of the process, executed when the respective process is launched. Libraries are self-contained sections of code implementing various functional aspects of a program. Shared libraries may be used independently by more than one program. Similar kinds of executable modules may be identified in host systems 10 executing operating systems such as Linux®, or MacOS®. Executable modules may be loaded and/or unloaded to/from memory during the launch and/or execution of the respective process.

In some embodiments, step 338 further includes determining a virtual and/or physical memory address (also termed base address) of each loaded module. Such memory addresses may point to a section of memory holding executable code and/or data of the respective module. Determining such memory addresses may comprise any method known in the art, such as parsing data structures employed by the operating system to represent currently executing processes and/or threads (e.g EPROCESS and PEB data structures in a Windows® environment).

In an embodiment as illustrated in FIG. 4-C, wherein security application 244 executes outside the protected virtual machine, steps 336 and 338 may be performed by the respective security agents 48a-b, which may then communicate data such as memory addresses, etc., to security application 244 by any method known in the art of virtualization.

In a step 340, security application 44 performs a code reuse analysis of the target thread. When the analysis reveals that the target thread is likely to be subject to a malware attack, in a step 344, security application 44 may take anti-malware action against the target process/thread. Exemplary anti-malware actions include stopping or restricting the execution of the target process, quarantining the target process, and notifying a user of host system 10, among others.

Several methods are known in the art for determining whether the target thread is subject to a code reuse attack, such as a ROP or JOP exploit. In one example, pertaining to ROP exploits, security application 44 may analyze the call stack of the target thread in response to detecting the switch event triggered by counter control unit 28. Analyzing the stack may include identifying items on the stack, which point to addresses within an executable module loaded by the target process. To determine whether a stack item points to a loaded module, application 44 may use data determined in steps 336-338 (see above). In some embodiments, counter control unit 28 may save memory addresses (e.g., values of the instruction pointer, or RIP) of branch and/or inter-branch instructions. When this mechanism is enabled, security application 44 may retrieve such addresses directly from a dedicated location, such as a dedicated internal stack or circular buffer of the CPU. Next, security application 44 may determine whether the target thread is subject to a ROP exploit according to a count of such stack items pointing to short snippets of code, commonly termed ROP gadgets. A more detailed example is shown below, in relation to FIGS. 7-8.

In another example, relevant to JOP exploits, security application 44 may analyze a sequence of branches counted by counters 22-24. A typical JOP attack relies on a gadget dispatcher using a dispatch table to redirect execution from one snippet of code (termed gadget) to another. The dispatch table may be injected into the memory space of a target process, for instance via a buffer overflow. An exemplary branching pattern of a JOP attack may include a sequence:

dispatcher→gadget 1→dispatcher→gadget 2→dispatcher→gadget 3→ . . .

In an embodiment where processor 20 is configured to save addresses (e.g., RIP) of branch and inter-branch instructions, security application 44 may search such records, looking for an indication of a scenario wherein execution repeatedly returns to the same address (possibly a dispatcher). Another exemplary approach to JOP detection includes analyzing the address of each gadget, to determine whether the address represents the beginning of a function. Legitimate branches typically redirect execution to the beginning of a function (e.g., a subroutine performing a specific task), while JOP gadgets are located randomly within the body of the function. Therefore, a branch destination address located somewhere within a function may be indicative of JOP.

Successful code reuse analysis may rely on the ability of processor 20 and/or security application 44 to perform thread-specific branch monitoring, i.e., to monitor only branches and inter-branch instructions belonging to a specific thread or process. In modern hardware and operating systems, execution is prone to frequent context switches, which change the processor from executing one thread to executing another thread. Some context switches may occur, for instance, due to scheduling. Other context switches are caused by hardware interrupts and other processor events that suspend execution of the current thread and switch the processor to executing an interrupt handler routine. In host systems employing hardware virtualization, a particular type of context switch (VM exit and/or VM entry) transfers control of the processor between the hypervisor and a thread executing within a virtual machine.

Some embodiments of the present invention may be configured to perform context-specific branch monitoring. Such functionality may be achieved, for instance, by enabling the processor to switch branch monitoring on or off in response to various processor events, and/or in response to context changes. Switching branch monitoring on and off may be achieved by setting a flag of configuration register(s) 26 to 1 or 0, respectively. The respective value may be used by processor 20 in step 304 (FIG. 5) to determine whether to update counters 22-24 for the currently executing thread. Processor 20 may thus handle various code reuse analysis scenarios. For instance, processor 20 may be configured to monitor only code executing in ring 3 (user mode), by switching branch monitoring off while executing in ring 0 (kernel mode). In another example, processor 20 may be configured to turn branch monitoring off in response to a hardware interrupt, and to resume branch monitoring when returning from the interrupt handler (e.g., in response to an IRET on x86 platforms). In yet another example, branch monitoring may be turned off in response to a VM exit processor event.

Figure 7:
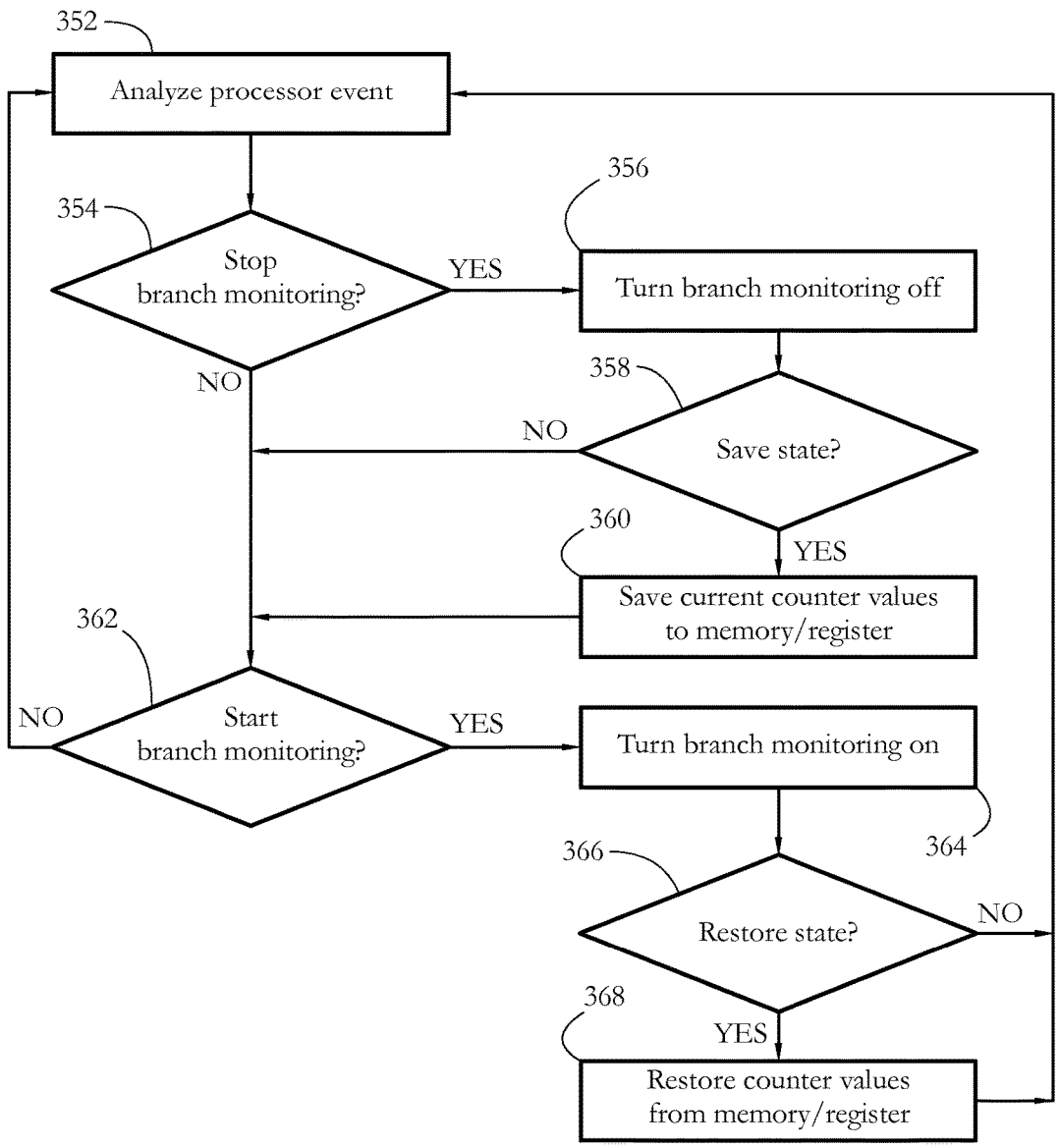
FIG. 7 shows an exemplary sequence of steps performed by the processor to manage branch monitoring in response to processor events such as interrupts and changes of execution context, according to some embodiments of the present invention.

FIG. 7 illustrates an exemplary sequence of steps carried out by processor 20 to manage branch monitoring in response to processor events such as hardware interrupts and changes of execution context, according to some embodiments of the present invention. When a processor event occurs, a step 352 analyzes the respective event, for instance to identify a type of the event (e.g., change of processor privilege level, hardware interrupt, VM exit, etc.). In a step 354, processor 20 may determine whether to stop branch monitoring in response to the current event, using either one or a combination of decision criteria. In some embodiments, a configuration register, such as register(s) 26 (FIG. 2) may store a set of flags instructing processor 20 to stop branch monitoring when a hardware interrupt occurs, and to resume branch monitoring when execution returns from the respective interrupt handler. Resuming branch monitoring may be triggered, for instance, by an IRET processor instruction signaling that the interrupt handler has finished. Another exemplary flag may instruct processor 20 not to perform branch monitoring when executing in ring 0 (kernel mode). In such configurations, when encountering an event such as a system call, consistent with a transition from ring 3 (user mode) to kernel mode, processor 20 may turn branch monitoring off, and resume branch monitoring when execution returns to ring 3.

In a step 358, processor 20 may determine whether to save the state, and when yes, a step 360 saves the values currently stored in counters 22-24 to a predetermined memory location or to a processor register. Saving counter values may facilitate context-specific branch monitoring, for instance by allowing processor 20 to suspend monitoring a first thread, switch to monitoring another thread, and then resume monitoring the first thread without losing the already determined counter values. In some embodiments, saving the state is performed by software, such as the operating system or hypervisor, which may read and/or write from/to counters 22-24 whenever the state needs to be saved or restored.

In a step 362, processor 20 may determine whether to start branch monitoring according to the latest processor event, and when yes, turn branch monitoring on in a step 364. Such a situation may arise, for instance, when processor 20 switches from executing an interrupt handler routine to executing the target thread. The decision to resume branch monitoring may be taken according to values stored in configuration register(s) 26. In a step 366, processor 20 determines whether to restore counters 22-24 to previously saved states, and when yes, a step 368 copies saved values from memory or a processor register into counter(s) 22-24. In some embodiments, restoring the state is performed by software, such as the operating system or hypervisor.

Figure 8:
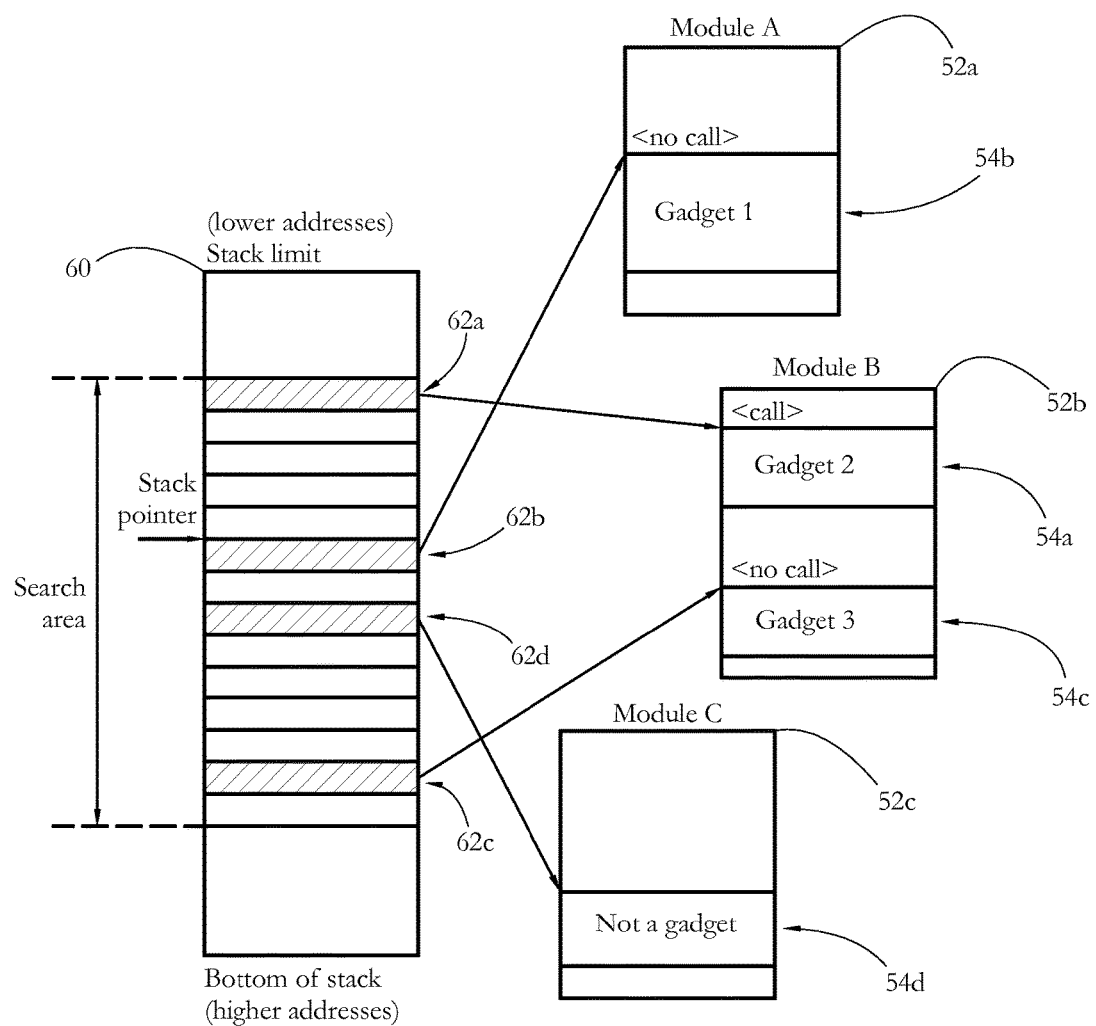
FIG. 8 illustrates an exemplary stack of a thread executing on the host system, the stack comprising a plurality of references, each pointing to a snippet of code of a loaded executable module. Some illustrated snippets may be identified as ROP gadgets.

FIG. 8 schematically illustrates an exemplary code reuse analysis, which may be performed by security application 44 (step 340 in FIG. 6) in response to intercepting processor switch event triggered by counter control unit 28. The example shown in FIG. 8 applies to detecting ROP exploits, wherein code reuse analysis comprises an analysis of a call stack 60 of a target thread. Exemplary stack 60 includes a plurality of references 62*a-d*, each reference pointing to a code snippet within a loaded executable module 52*a-c*, such as a DLL. In some embodiments, code-reuse analysis may comprise determining whether such snippets are ROP gadgets, i.e., relatively short sequences of instructions followed by a return instruction. In some embodiments, a decision whether a sequence of instructions is a ROP gadget is made according to a count of instructions preceding a return instruction, and/or according to a type of instruction found within the respective sequence. For instance, in some embodiments, when a sequence contains a CALL instruction, the respective sequence is not considered a ROP gadget. In the example of FIG. 7, snippets 54*a-c* are ROP gadgets, while snippet 54*d* is not a ROP gadget.

In some embodiments, code reuse analysis may further determine whether the reference to each identified ROP gadget was pushed on the stack as part of the original, legitimate functionality of the target thread/process, as opposed to an exploit. Security application 44 may, for instance, inspect the instruction immediately preceding the respective ROP gadget in the memory space of the respective module, to determine whether the instruction comprises a call resulting in the selected gadget reference being pushed onto the stack. In some embodiments, a call pushing the reference to the ROP gadget onto the stack, the call immediately preceding the ROP gadget, indicates a legitimate call. In the example of FIG. 8, ROP gadget 2 is preceded by a legitimate call, whereas gadgets 1 and 3 are not. Gadgets 1 and 3 may therefore be identified as suspect. In some embodiments, security application 44 may determine whether the target thread is subject to a ROP exploit according to a count of suspect ROP gadgets identified within the call stack of the target thread, or according to a count of suspect ROP gadgets within the same loaded executable module.

Figure 9:
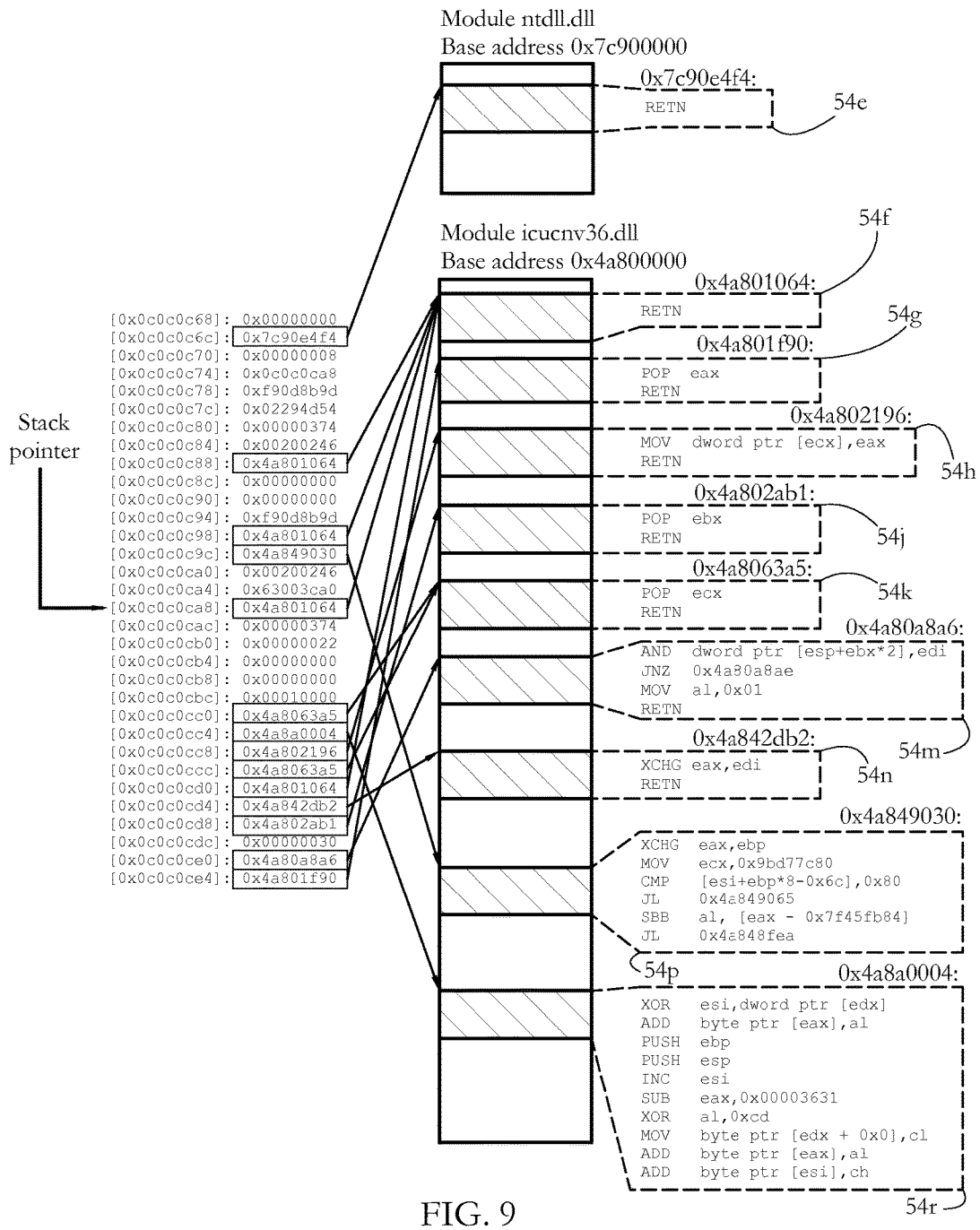
FIG. 9 illustrates an exemplary stack of a thread subject to an ROP exploit, according to some embodiments of the present invention.

FIG. 9 shows an exemplary stack of a thread subjected to a ROP exploit. References are represented within rectangular boxes. The contents of each section of memory pointed to by a reference were disassembled and shown as a sequence of instructions 54e-r found within the respective section of memory. Sections 54p-r do not contain ROP gadgets. In contrast, sections 54e-n contain ROP gadgets.

The exemplary systems and methods described above allow protecting a host system from malicious code-reuse software, such as ROP and JOP exploits. In some embodiments, a processor of the host system is endowed with at least two counter registers, configurable to store a count of branch instructions and a count of inter-branch instructions, respectively, occurring within a stream of instructions fetched by the processor for execution. In some embodiments, branch instructions include instructions such as JMP and CALL on x86 platforms, while inter-branch instructions are instructions executed between two consecutive branch instructions. The processor may be further configured to generate a processor event, such as an exception or interrupt, when a value of a counter exceeds a predetermined threshold. Such processor events may be used as triggers for launching a malware analysis to determine whether the host system is subject to a code reuse attack.

Code reuse analysis typically includes suspending an executing thread to analyze thread-specific data structures, such as the call stack and executable modules (e.g., DLLs) loaded by a process owning the respective thread. Such analyses may place a substantial computational burden on the host system, with negative impact on user experience. Some conventional anti-malware systems and methods employ malware-indicative events as selective triggers for launching a code reuse analysis. Exemplary trigger events used in conventional core reuse protection include, among others, a system call, such as a SYSCALL instruction on Intel® platforms, switching the processor from executing in user mode (e.g., ring 3) to executing in kernel mode (e.g., ring 0).

However, system calls may be executed quite frequently as part of legitimate software functionality. Using such events as triggers may therefore result in a substantial rate of false alarms and unnecessary computation. Instead of using such trigger events, some embodiments of the present invention use hardware-implemented counters to monitor the branching behavior of currently executing code, and trigger code reuse analysis only when counter values suggest the likelihood of a malware attack. In one such example, the processor may be configured to generate an exception when it detects the execution of a chain of short code snippets mutually connected via branch instructions (e.g., JPM, CALL, RET, etc.). Such behavior may be indicative of a code-reuse attack, for instance of a ROP or JOP exploit. The exception generated by the processor upon detecting such behavior may be used as a trigger for launching a code reuse analysis, e.g., an analysis of the call stack.

The exception that triggers the anti-malware analysis of the call stack may be generated when the length of a chain of code snippets exceeds a first threshold (e.g., 7). In some embodiments, the exception may be also triggered by shorter chains (e.g., exceeding 4 code snippets), when at least one of the respective branch instructions redirects execution to a critical OS function, such as a function performing memory allocation or another operation which can be exploited for malicious purpose. Such embodiments rely on the insight that code reuse attacks are strongly limited in scope by the constraint of having to rely on existing code, as opposed to running their own custom-designed code. To be able to achieve complex malicious operations, a code reuse attack may need to either assemble a long chain of code snippets, or use a short chain, but one that employs the complex functionality of certain OS functions. Some embodiments of the present invention address both types of attacks; long chains generate an exception by exceeding a length threshold, while short chains are further analyzed to determine whether they call a critical OS function. Threshold values, as well as the selection of monitored critical OS functions, may be customizable. In addition, some embodiments may allow a process-specific selection of monitored critical OS functions. Calling a particular OS function may thus trigger an exception during execution of some processes, but not of others.

Conventional code reuse analysis is further complicated by occasional context switches, wherein the processor changes from executing one thread to executing another thread. Context switches occur, for instance, due to thread scheduling and hardware interrupts, among others. When context switches occur, security-relevant data structures such as the call stack may end up with mixed data from multiple execution contexts. In contrast, some embodiments of the present invention are configurable to perform thread-specific branch monitoring. In one such example, the processor is endowed with a configuration register, which may store a plurality of values configuring the operation of branch and inter-branch instruction counters. Some sections/fields of the configuration register may indicate to the processor whether to switch branch monitoring on or off in response to the occurrence of certain processor events, and/or in response to a change of context. In some embodiments, the configuration register may be writable by software, such as the operating system and/or a hypervisor, allowing for a software-controlled customization of branch monitoring. Such customization may allow some embodiments of the present invention to be used for a variety of problems, including malware detection, code debugging, code optimization, etc.

In some embodiments, code reuse analysis is further facilitated by saving an indicator of a memory location (e.g., a value of an instruction pointer such as the RIP) of each counted branch and/or inter-branch instruction to a processor register or to a reserved section or memory. Anti-malware software may then directly retrieve such addresses when needed, without further computation.

In some embodiments, the type of branch instruction counted by the processor is customizable. Typical monitored branch instructions include indirect jump and call instructions (e.g., JMP, CALL on x86 platforms). By changing the type of instruction counted by the processor, some embodiments may be tailored to a variety of applications. In one such example, excluding conditional branch instructions (e.g., JNZ on x86 platforms) from monitoring may prevent counting instructions executed repeatedly as part of a loop.

Various functional aspects of the present invention may be implemented at various stages of the processor pipeline. For instance, a determination of whether an instruction should be counted as a branch or an inter-branch instruction may be done at the instruction decode stage. Virtual addresses of instructions may be determined and saved at the decode and/or execution stage. Advantageously, trigger events may be injected at several stages. For instance, a division by zero exception may be generated at the execution stage, while a page fault may be generated at the memory access stage. Such flexibility may offer a skilled artisan substantial freedom in implementing some features of the present invention.

It will be clear to a skilled artisan that the above embodiments may be altered in many ways without departing from the scope of the invention. Accordingly, the scope of the invention should be determined by the following claims and their legal equivalents.

What is claimed is:

1. A host system including at least one hardware processor configured to execute a security module, wherein:
   the at least one hardware processor comprises:
      a branch counter register storing a count of branch instructions occurring within a sequence of instructions belonging to a process currently being executed by the at least one hardware processor,
      a configuration register storing a first memory address, and
      a counter control unit connected to the branch counter register and to the configuration register, the counter control unit comprising hardware logic configured to:
         compare the count of branch instructions to a predetermined first threshold,
         in response, when the count of branch instructions exceeds the first threshold, compare the first memory address to a second memory address, wherein a selected instruction of the sequence causes the at least one hardware processor to execute code stored at a memory location indicated by the second memory address, and
         in response to comparing the first and second memory addresses, when the first memory address matches the second memory address, trigger a switch event causing the at least one hardware processor to switch from executing the process to executing an event handler routine;
   and wherein the security module is configured to:
      write the first address to the configuration register, and
      in response to the switch event, determine whether the host system is subject to a malware attack.

2. The host system of claim 1, wherein branch instructions include at least one instruction selected from a group consisting of a jump instruction, a call instruction, and a return instruction.

3. The host system of claim 1, wherein the security module is further configured, in preparation for writing the first memory address, to determine the first memory address according to another memory location of a memory management function of an operating system executing on the host system.

4. The host system of claim 3, wherein the memory management function is configured to allocate memory for entities executing on the host system.

5. The host system of claim 3, wherein the memory management function is configured to change permissions regulating access to a section of memory.

6. The host system of claim 1, wherein the configuration register stores a plurality of memory addresses including the first memory address, and wherein comparing the first and second memory addresses comprises selectively retrieving the first memory address according to the process.

7. The host system of claim 1, wherein the switch event comprises an exception, and wherein the event handler routine comprises an exception handler registered in an interrupt descriptor table (IDT) of the at least one hardware processor.

8. The host system of claim 1, wherein the host system exposes a virtual machine, wherein the sequence of instructions consists of code executing within the virtual machine, and wherein the security module executes outside the virtual machine.

9. The host system of claim 1, wherein the host system exposes a virtual machine, wherein the sequence of instructions consists of code executing within the virtual machine, and wherein the security module executes inside the virtual machine.

10. A method of protecting a host system against malware, the method comprising:
    employing a security module executing on at least one hardware processor of the host system to write a first memory address into a configuration register of the at least one hardware processor;
    employing a branch counter register of a hardware processor of a host system to store a count of branch instructions occurring within a sequence of instructions belonging to a process currently being executed by the processor;
    in response to storing the count of branch instructions, employing a counter control unit of the hardware processor to compare the count of branch instructions to a predetermined first threshold;
    in response, when the count of branch instructions exceeds the first threshold, employing the counter control unit to compare the first memory address to a second memory address, wherein a selected instruction of the sequence causes the hardware processor to execute code stored at a memory location indicated by the second memory address;
    in response to comparing the first and second memory addresses, when the first memory address matches the second memory address, triggering a switch event causing the hardware processor to switch from executing the process to executing an event handler routine; and
    in response to the switch event, employing the security module to determine whether the host system is subject to a malware attack.

11. The method of claim 10, wherein branch instructions include at least one instruction selected from a group consisting of a jump instruction, a call instruction, and a return instruction.

12. The method of claim 10, further comprising, in preparation for writing the first memory address, determining the first memory address according to another memory location of a memory management function of an operating system executing on the host system.

13. The method of claim 12, wherein the memory management function is configured to allocate memory for entities executing on the host system.

14. The method of claim 12, wherein the memory management function is configured to change permissions regulating access to a section of memory.

15. The method of claim 10, wherein the configuration register stores a plurality of memory addresses including the first memory address, and wherein comparing the first and second memory addresses comprises selectively retrieving the first memory address according to the process.

16. The method of claim 10, wherein the switch event comprises an exception, and wherein the event handler routine comprises an exception handler registered in an interrupt descriptor table (IDT) of the at least one hardware processor.

17. The method of claim 10, wherein the host system exposes a virtual machine, wherein the sequence of instructions consists of code executing within the virtual machine, and wherein the security module executes outside the virtual machine.

18. The method of claim 10, wherein the host system exposes a virtual machine, wherein the sequence of instructions consists of code executing within the virtual machine, and wherein the security module executes inside the virtual machine.

19. A non-transitory computer-readable medium storing instructions which, when executed by at least one hardware processor of a host system, cause the host system to form a security module, wherein:

the at least one hardware processor comprises:
  a branch counter register configured to store a count of branch instructions occurring within a sequence of instructions belonging to a process currently being executed by the at least one hardware processor,
  a configuration register storing a first memory address, and
  a counter control unit connected to the branch counter register and to the configuration register, the counter control unit comprising hardware logic configured to:
    compare the count of branch instructions to a predetermined first threshold,
    in response, when the count of branch instructions exceeds the first threshold:
      compare the first memory address to a second memory address, wherein a selected instruction of the sequence causes the at least one hardware processor to execute code stored at a memory location indicated by the second memory address, and
      in response to comparing the first and second memory addresses, when the first memory address matches the second memory address, trigger a switch event causing the at least one hardware processor to switch from executing the process to executing an event handler routine;
and wherein the security module is configured to:
  write the first address to the configuration register, and
  in response to the switch event, determine whether the host system is subject to a malware attack.

20. The computer readable medium of claim 19, wherein the security module is further configured, in preparation for writing the first memory address, to determine the first memory address according to another memory location of a memory management function of an operating system executing on the host system.

* * * * *